United States Patent
Takeda et al.

(10) Patent No.: US 11,776,210 B2
(45) Date of Patent: Oct. 3, 2023

(54) 3D FACE MODELING BASED ON NEURAL NETWORKS

(71) Applicant: SONY GROUP CORPORATION, Tokyo (JP)

(72) Inventors: Hiroyuki Takeda, San Jose, CA (US); Mohammad Gharavi Alkhansari, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 29 days.

(21) Appl. No.: 17/155,934

(22) Filed: Jan. 22, 2021

(65) Prior Publication Data

US 2022/0237869 A1  Jul. 28, 2022

(51) Int. Cl.
| | | |
|---|---|---|
| *G06T 17/20* | (2006.01) | |
| *G06N 3/08* | (2023.01) | |
| *G06T 13/40* | (2011.01) | |
| *G06T 19/20* | (2011.01) | |

(52) U.S. Cl.
CPC ............... *G06T 17/20* (2013.01); *G06N 3/08* (2013.01); *G06T 13/40* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 11,055,514 B1 * | 7/2021 | Cao | .................. | G06V 40/172 |
| 11,222,466 B1 * | 1/2022 | Naruniec | ................ | G06T 19/00 |
| 2009/0135177 A1 * | 5/2009 | Strietzel | .................. | G06T 13/40 |
| | | | | 704/E15.005 |
| 2009/0195545 A1 | 8/2009 | Debevec | | |
| 2014/0210831 A1 * | 7/2014 | Stenger | ................... | G06T 13/40 |
| | | | | 345/474 |

(Continued)

FOREIGN PATENT DOCUMENTS

| | | |
|---|---|---|
| CN | 109255831 A | 1/2019 |
| CN | 111091624 | 5/2020 |

OTHER PUBLICATIONS

Kuang, et al., "3D Face Reconstruction with Texture Details from a Single Image Based on GAN", 11th International Conference on Measuring Technology and Mechatronics Automation (ICMTMA), Apr. 2019, pp. 385-388.

(Continued)

*Primary Examiner* — Sultana M Zalalee
(74) *Attorney, Agent, or Firm* — CHIP LAW GROUP

(57) ABSTRACT

An electronic device and method for 3D face modeling based on neural networks is provided. The electronic device receives a two-dimensional (2D) color image of a human face with a first face expression and obtains a first three-dimensional (3D) mesh of the human face with the first face expression based on the received 2D color image. The electronic device generates first texture information and a first set of displacement maps. The electronic device feeds the generated first texture information and the first set of displacement maps as an input to the neural network and receives an output of the neural network for the fed input. Thereafter, the electronic device generates a second 3D mesh of the human face with a second face expression which is different from the first face expression based on the received output.

17 Claims, 8 Drawing Sheets

(56) References Cited

U.S. PATENT DOCUMENTS

| | | | |
|---|---|---|---|
| 2016/0035142 A1* | 2/2016 | Nair | A63F 13/56 |
| | | | 345/420 |
| 2016/0253839 A1* | 9/2016 | Cole | H04N 13/189 |
| | | | 345/420 |
| 2017/0024921 A1* | 1/2017 | Beeler | G06T 13/40 |
| 2018/0089883 A1* | 3/2018 | De Goes | G06T 11/001 |
| 2018/0253593 A1* | 9/2018 | Hu | G06V 40/165 |
| 2019/0147227 A1* | 5/2019 | Ko | G06K 9/6267 |
| | | | 382/118 |
| 2019/0172243 A1* | 6/2019 | Mishra | G06K 9/6256 |
| 2019/0294868 A1* | 9/2019 | Martinez | G06N 3/08 |
| 2019/0295302 A1* | 9/2019 | Fu | G06T 11/60 |
| 2020/0051303 A1 | 2/2020 | Li | |
| 2022/0108422 A1* | 4/2022 | Choi | G06T 17/00 |

OTHER PUBLICATIONS

Gecer, et al., "GANFIT: Generative Adversarial Network Fitting for High Fidelity 3D Face Reconstruction", IEEE, Conference on Computer Vision and Pattern Recognition (CVPR), Version 2, Apr. 6, 2019, pp. 1155-1164.

Pini, et al., "Learning to Generate Facial Depth Maps", Computer Vision and Pattern Recognition (cs.CV), URL: https://arxiv.org/pdf/1805.11927.pdf, May 30, 2018, 08 pages.

Zollhofer, et al., "State of the Art on Monocular 3D face Reconstruction, Tracking, and Applications," Computer Graphics Forum., vol. 37, No. 2, 2018, 28 pages.

Geng, et al., "Warp-guided GANs for single-photo facial animation", ACM Transactions on Graphics, vol. 37, No. 6, Sep. 2018, 12 pages.

Charles, et al., "PointNet: Deep Learning on Point Sets for 3D Classification and Segmentation", Conference on Computer Vision and Pattern Recognition (CVPR), IEEE, Jul. 21-26, 2017, pp. 77-85.

Yi, et al., "DualGAN: Unsupervised Dual Learning for Image-to-Image Translation", International Conference on Computer Vision (ICCV), IEEE, Oct. 22-29, 2017, pp. 2868-2876.

Zhu, et al., "Unpaired Image-to-lmage Translation Using Cycle-Consistent Adversarial Networks", IEEE, International Conference on Computer Vision (ICCV), Oct. 22-29, 2017, pp. 2242-2251.

Kim, et al., "Learning to discover cross-domain relations with generative adversarial networks", Proceedings of the 34th International Conference on Machine Learning, vol. 70, Aug. 2017, pp. 1857-1865.

Choi, et al., "StarGAN: Unified Generative Adversarial Networks for Multi-domain Image-to-Image Translation", IEEE, Conference on Computer Vision and Pattern Recognition, Jun. 18-23, 2018, pp. 8789-8797.

Essa, et al., "Modeling, tracking and interactive animation effaces and heads/lusing input from video", IEEE, Proceedings Computer Animation, Jun. 3-4, 1996, pp. 68-79.

Geng Jiahao et al: "Warp-guided GANs for single-photo facial animation", ACM Transactions on Graphics, ACM, NY, US,vol. 37, No. 6,Dec. 4, 2018 (Dec. 4, 2018), pp. 1-12,XP058464756,ISSN: 0730-0301, DOI:10.1145/3272127.3275043 the whole document.

Geng Zhenglin et al: "3D Guided Fine-Grained Face Manipulation",2019 IEEE/CVF Conference on Computervision and Pattern Recognition (CVPR),IEEE,Jun. 15, 2019 (Jun. 15, 2019), pp. 9813-9822, XP033687319,DOI: 10.1109/CVPR.2019.01005[retrieved on Jan. 8, 2020] figures 1-5, 9-11 abstract chapter: 1. "Introduction":p. 9813-p. 9814 chapter: 3, "Method":p. 9815-p. 9817.

Jiaman Li et al: "Dynamic Facial Asset and Rig Generation from a Single Scan", arxiv.org, Cornell University Library, 201OLIN Library Cornell University Ithaca, NY14853,Oct. 1, 2020 (Oct. 1, 2020), XP081775931 the whole document.

Yang Haotian et al: "FaceScape: A Large-Scale High Quality 3D Face Dataset and Detailed Riggable 3D Face Prediction",2020 IEEE/CVF Conference on Computervision and Pattern Recognition (CVPR),IEEE,Jun. 13, 2020 (Jun. 13, 2020), pp. 598-607,XP033805120, DOI: 10.1109/CVPR42600.2020.00068[retrieved on Aug. 3, 2020] the whole document.

\* cited by examiner

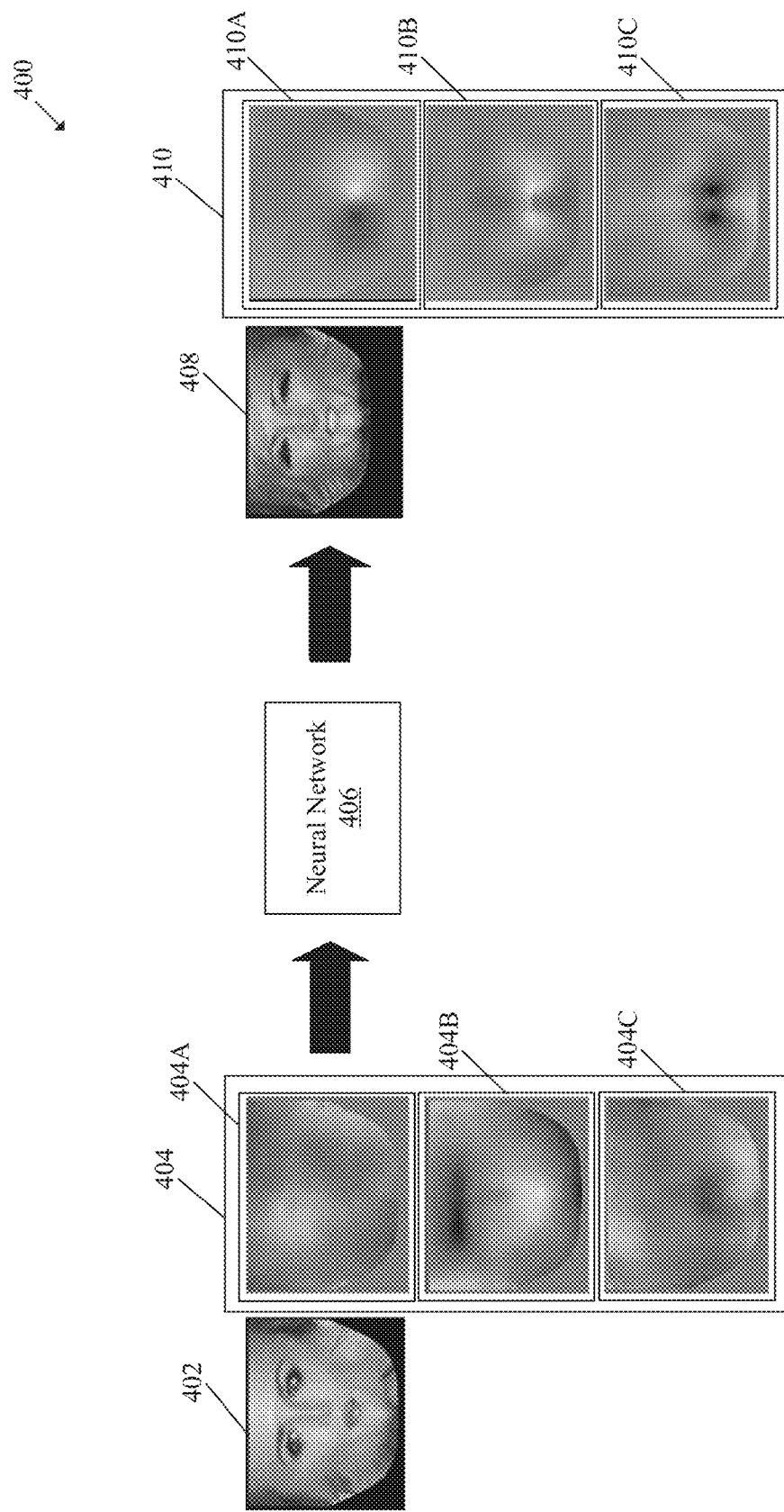

3D FACE MODELING BASED ON NEURAL NETWORKS

CROSS-REFERENCE TO RELATED APPLICATIONS/INCORPORATION BY REFERENCE

None.

FIELD

Various embodiments of the disclosure relate to three-dimensional (3D) modeling, virtual human technology, and virtual reality. More specifically, various embodiments of the disclosure relate to an electronic device and method for three-dimensional (3D) face modeling based on neural networks.

BACKGROUND

Advancements in the field of three-dimensional (3D) computer graphics and 3D modeling have provided the ability to create dynamic 3D models and visualize real objects in a 3D computer graphics environment. 3D content, such as a 3D character model, is increasingly used in animated movies, games, and virtual-reality systems to enhance user experience. A 3D model is a 3D mesh that resembles the shape of a particular object (for example a human face). The dynamic 3D models of the human face are 3D models with different face expressions. Usually, these dynamic 3D models are generated from a set of static 3D models of a single person with different face expressions. However, this process of the generation is time-consuming and cumbersome. Other methods for generation of dynamic 3D face models involve using blend shapes that are created manually from multiple images of face of the person captured with different face expressions. However, the environment required for manual creation of multiple images requires set up of multiple image-capture devices (such as cameras) and such setup may be expensive. Another method for generation of dynamic 3D face models may involve using generic blend shapes. However, the face expressions of each of the dynamic 3D face models created using the generic blend shapes may be similar and therefore, such models may be of less use in real-world applications.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for 3D face based on neural networks is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 4 depicts an exemplary architecture for 3D face modeling based on neural networks, in accordance with an embodiment of the disclosure.

DETAILED DESCRIPTION

Figure 1:
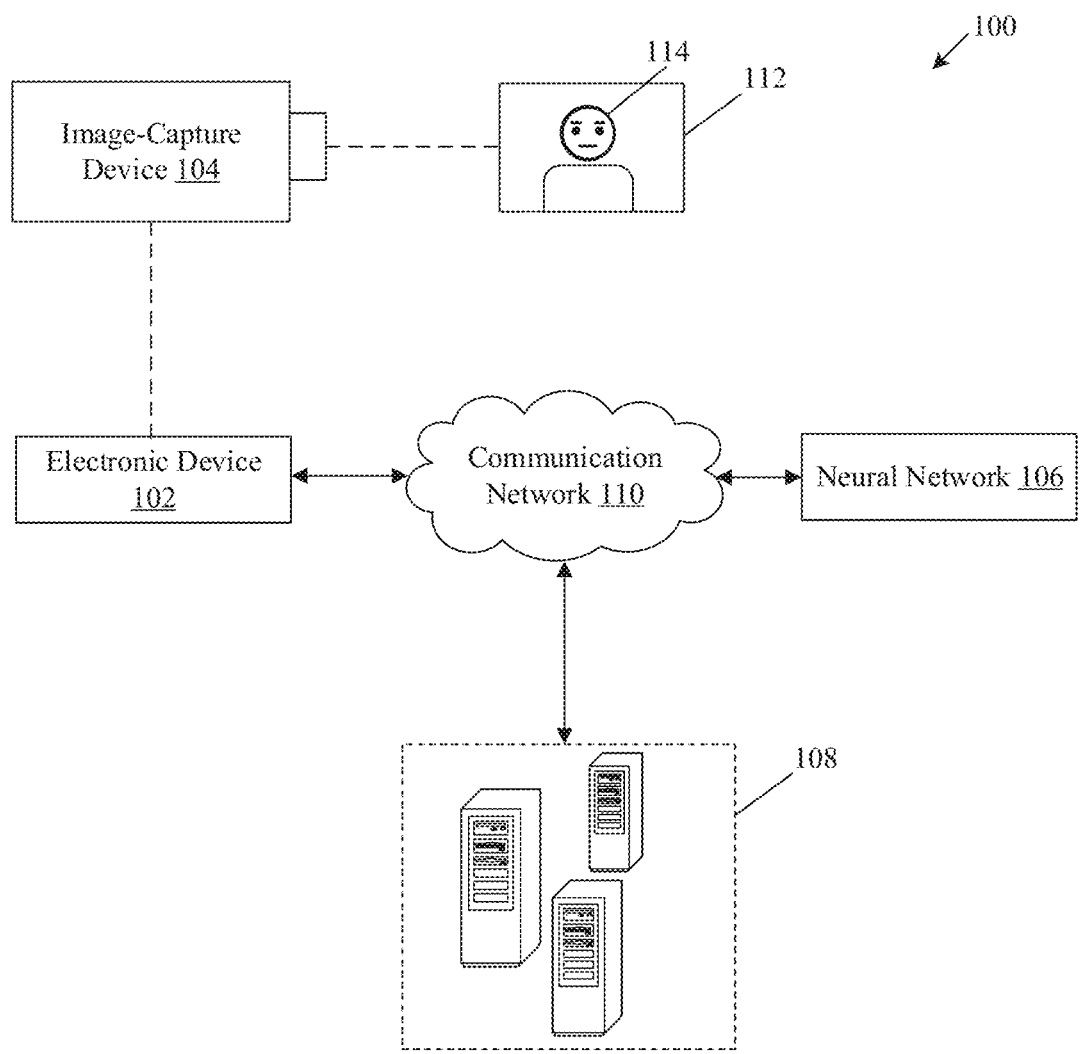
FIG. 1 is a diagram that illustrates an environment for 3D face modeling based on neural networks, in accordance with an embodiment of the disclosure.

The following described implementations may be found in the disclosed electronic device and method for three-dimensional (3D) face modeling based on a neural network, such as a Generative Adversarial Network (GAN). The electronic device may receive a two-dimensional (2D) color image of a human face. The human face in the 2D color image may have a first face expression (such as a neutral face expression). The electronic device may obtain a 3D mesh of the human face based on the received 2D color image and may generate first texture information for the 3D mesh. Thereafter, the electronic device may generate a first set of displacement maps (such as X, Y, Z displacement maps) based on the 3D mesh and may feed an input including the generated first texture information and the generated first set of displacement maps to a neural network (such as an image-to-image GAN), which may be trained on an image-to-image translation task. The electronic device may further receive an output of the neural network for the fed input. The received output may include second texture information and a second set of displacement maps.

The electronic device may further generate a second 3D mesh of the human face with a second face expression based on the received output. The second face expression may be a face expression which may be different from the first face expression. Similarly, multiple 3D meshes of the human face with other face expressions may be generated by the neural network (with or without a suitable configuration change) from the input. Such meshes, including the first and second 3D meshes may be used as blend shapes. From a single-color image, the electronic device may be configured to implement a single-shot dynamic 3D face modeling to generate a blend-shape-based facial animation of the human face based on such blend shapes.

Some conventional methods use images of a human face from several viewpoints to generate a 3D mesh. For instance, blend shapes required for facial animation may be manually created from many captured images of a face with different face expressions. A light state setup, with hundreds of cameras, is widely used as a capturing setup. Setting up multiple cameras can be expensive at times. In contrast, the electronic device may generate several 3D meshes of the human face with different face expressions from a single 2D color image of the human face. Without a need to capture images from multiple viewpoints, the electronic device may rely on a single camera (which can be any generic camera, such as a phone camera, for example).

Some conventional methods use generic blend shapes to morph a 3D face model to create more blend shapes for facial animation. In many instances, face expressions of two or more blend shapes generated using such generic shapes may appear to be very similar and artificial, with little to no difference. In contrast, the electronic device may use a neural network to infer the required blend shapes for facial animation. Such blend shapes may be also referred to as person-adaptive blend shapes. Use of the neural network, such as an image-to-mage GAN may be advantageous because it may not require paired images for training, unlike a more conventional image-to-image convolutional neural network (CNN).

FIG. 1 is a diagram that illustrates an environment for 3D face modeling based on neural networks, in accordance with an embodiment of the disclosure. With reference to FIG. 1, there is shown a diagram of a network environment 100. The network environment 100 includes an electronic device 102, an image-capture device 104, a neural network 106, a server 108, and a communication network 110. With reference to FIG. 1, there is also shown a two-dimensional (2D) color image 112 of a human face 114.

The electronic device 102 may include suitable logic, circuitry, interfaces, and/or code that may be configured to generate 3D meshes as blend shapes of the human face 114, with different face expressions from a single-color image (such as the 2D color image 112). In some embodiments, the electronic device 102 may render a blend-shape based facial animation of the human face 114 based on such blend shapes. Examples of the electronic device 102 may include, but are not limited to, a computing device, a mainframe machine, a server, a computer work-station, a smartphone, a cellular phone, a mobile phone, a gaming device, a wearable display, a consumer electronic (CE) device, and/or any other device with image processing capabilities.

The image-capture device 104 may include suitable logic, circuitry, and interfaces that may be configured to capture the 2D color image 112 of the human face 114. The 2D color image 112 may be captured from a specific viewpoint and with a first face expression. For example, the 2D color image 112 may be a frontal image of the human face 114 with a neutral face expression. The image-capture device 104 may be configured to transmit the captured 2D color image 112 of the human face 114 to the electronic device 102. Examples of the image-capture device 104 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image-capture devices.

In FIG. 1, the image-capture device 104 is shown to be separated from the electronic device 102; however, the disclosure may not be so limiting. In some embodiments, the image-capture device 104 may be integrated into the electronic device 102, without deviating from scope of the disclosure.

The neural network 106 may be a computational network or a system of artificial neurons, arranged in a plurality of layers, as nodes. The plurality of layers of the neural network 106 may include an input layer, one or more hidden layers, and an output layer. Each layer of the plurality of layers may include one or more nodes (or artificial neurons, for example). Outputs of all nodes in the input layer may be coupled to at least one node of hidden layer(s). Similarly, inputs of each hidden layer may be coupled to outputs of at least one node in other layers of the neural network 106. Outputs of each hidden layer may be coupled to inputs of at least one node in other layers of the neural network 106. Node(s) in the final layer may receive inputs from at least one hidden layer to output a result. The number of layers and the number of nodes in each layer may be determined from hyper-parameters of the neural network 106. Such hyper-parameters may be set before or while training the neural network 106 on a training dataset.

Each node of the neural network 106 may correspond to a mathematical function (e.g., a sigmoid function or a rectified linear unit) with a set of parameters, tunable during training of the neural network 106. The set of parameters may include, for example, a weight parameter, a regularization parameter, and the like. Each node may use the mathematical function to compute an output based on one or more inputs from nodes in other layer(s) (e.g., previous layer(s)) of the neural network 106. All or some of the nodes of the neural network 106 may correspond to same or a different same mathematical function.

In training of the neural network 106, one or more parameters of each node of the neural network 106 may be updated based on whether an output of the final layer for a given input (from the training dataset) matches a correct result based on a training metric (such as a loss function) for the neural network 106. The above process may be repeated for same or a different input till the training metric is above a threshold (such as a minimum of the loss function is achieved) and a training error is minimized. Several methods for training are known in art, for example, adversarial training, reinforcement learning, gradient descent, stochastic gradient descent, batch gradient descent, gradient boost, meta-heuristics, and the like.

In an exemplary embodiment, the neural network 106 may be a GAN, which may include a generator network and a discriminator network. The generator network may generate new examples and discriminator network may classify whether the generated examples are real or fake. For instance, a new example may include a 3D mesh and texture information of a face with a new expression. In general, the GAN is based on a game theoretic scenario in which the generator network must compete against an adversary. The generator network directly produces examples. Its adversary, the discriminator network, attempts to distinguish between examples drawn from a training set and examples drawn from the generator network. The two networks may be trained together in a zero-sum game, until the discriminator network is fooled about half the time in its attempts to correctly distinguish between the examples, which may mean that the generator network is generating plausible examples. In some instances, the discriminator network may penalize the generator network for producing implausible examples. The output of the generator network may be connected directly to the input of the discriminator network. The classification of the discriminator network may provide a signal that the generator network to update its weights, for example, via backpropagation.

In an embodiment, the neural network 106 may include electronic data, which may be implemented as, for example, a software component of an application executable on the electronic device 102. The neural network 106 may rely on libraries, external scripts, or other logic/instructions for execution by a processing device, such as the electronic device 102. The neural network 106 may enable a computing device, such as the electronic device 102 to perform one or more operations. For example, such operations may be associated with generation of displacement maps and texture information for a new face expression from displacement maps and texture information for a neutral face expression.

In an embodiment, the neural network 106 may be implemented using hardware including a processor, a co-processor (such as an Artificial Intelligence (AI) accelerator chip), a microprocessor, a field-programmable gate array (FPGA), or an application-specific integrated circuit (ASIC). In some embodiments, the neural network 106 may be implemented using a combination of both hardware and software. Examples of the neural network 106 may include, but are not limited to, a deep neural network (DNN), a convolutional neural network (CNN), a GAN, an image-to-image GAN, a bi-directional GAN, a spatial attention GAN, a conditional GAN, a pix2pix GAN, a Deep GAN, a weakly supervised GAN, a CycleGAN, StarGAN, BicycleGAN, a multiscale GAN, a Harmonic GAN, an unsupervised image-to-image translation network (UNIT) based on Coupled GAN, and/or a combination of such networks.

The server 108 may include suitable logic, circuitry, and interfaces, and/or code that may be configured to store the received 2D color image 112. In an embodiment, based on a request from the electronic device 102, the server 108 may send the 2D color image 112 to the electronic device 102. The server 108 may be implemented as a cloud server and may execute operations through web applications, cloud applications, HTTP requests, repository operations, file transfer, and the like. Other example implementations of the server 108 may include, but are not limited to, a database server, a file server, a web server, a media server, an application server, a mainframe server, or a cloud computing server.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108 and the electronic device 102 as two separate entities. In certain embodiments, the functionalities of the server 108 can be incorporated in its entirety or at least partially in the electronic device 102, without a departure from the scope of the disclosure.

The communication network 110 may include a communication medium through which the electronic device 102, the image-capture device 104, and the server 108 may communicate with each other. The communication network 110 may be one of a wired connection or a wireless connection. Examples of the communication network 110 may include, but are not limited to, the Internet, a cloud network, a Wireless Fidelity (Wi-Fi) network, a Personal Area Network (PAN), a mobile wireless network (such as a 4th Generation Long-Term Evolution (LTE) network or a 5th Generation New Radio (NR) network), a Local Area Network (LAN), or a Metropolitan Area Network (MAN). Various devices in the network environment 100 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols (such as 4G LTE or 5G NR), and Bluetooth (BT) communication protocols.

In operation, the electronic device 102 may be configured to receive the 2D color image 112 of the human face 114 with the first face expression, for example, from the image-capture device 104 or from the server 108. In an exemplary embodiment, the first face expression may be a neutral face expression in which face muscles may be in a relaxed position and may be visibly devoid of an emotional expression. For example, Facial Action Coding System (FACS) taxonomizes human facial movements by their appearance on the face. In FACS, an action unit may be defined as a contraction or relaxation of one or more muscles of the face. FACS define a neutral face with an action number as zero (0). In another embodiment, the first face expression may be any expression other than the neutral face expression.

Based on the reception of the 2D color image 112, the electronic device 102 may be configured to obtain a first 3D mesh of the human face 114 with the first face expression. The first 3D mesh may be a 3D structure of the human face 114 and may be made up of connected polygons which form vertices, edges, and polygonal faces of the first 3D mesh. The first 3D mesh may use polygonal surfaces to define a shape and geometry of the human face 114 with the first face expression.

The electronic device 102 may be further configured to generate first texture information for the obtained first 3D mesh. The first texture information may be generated based on the received 2D color image 112. Methods to generate texture information, such as in the form of a texture map from a color image may be well known to one skilled in the art. In one method, the electronic device 102 may generate a U-V co-ordinate map and may transform and map each polygon on the 2D color image 112 to a corresponding polygon on the U-V coordinate map by using the first 3D mesh. After mapping, the U-V coordinate map may depict the texture information for the first 3D mesh on a 2D layout and in terms of UV coordinates.

The electronic device 102 may be further configured to generate a first set of displacement maps based on the obtained first 3D mesh. The first set of displacement maps may include a first displacement map along a first orthogonal axis (such as X-axis), a second displacement map along a second orthogonal axis (such as Y-axis), and a third displacement map along a third orthogonal axis (such as Z-axis). Details of the generation of the displacement maps are covered in FIG. 3, for example.

The electronic device 102 may be further configured to feed an input to the neural network 106 that may be trained on an image-to-image translation task. The image-to-image translation task may be a task to generate blend shape information for new face expressions from blend shape information for a seed face expression (such as a neutral face) which may be different from the new face expressions.

The input may include the generated first texture information and the generated first set of displacement maps. The first texture information may be included in the input along with the first set of displacement maps because the first texture information may contain some geometric information of the surface of the first 3D mesh. In an embodiment, the generated first texture information and the generated first set of displacement maps may be included in the input as six channel bivariate data. The multi-channel bivariate representation may be preferred so as to process the first 3D mesh similar to processing of images using the convolution operation. This may be advantageous because of the translational invariability and space and computational complexity associated with the convolution operation. While it may be preferred to apply the convolutional operation along the surface of the first 3D mesh; however, that is not possible because the vertices of the first 3D mesh may be irregularly spaced. Therefore, techniques, such as UV-unwrapping may be used to convert the first 3D mesh into three-channel bivariate data, referred to as the first set of displacement maps. Also, the first texture information, i.e. the RGB texture, may be represented as three channel bivariate data. Together, the input may include six channels, i.e. three channels of RGB texture and three channel displacement maps. Processing the six-channel bivariate data may be equivalent to processing a 3D model of the human face 114.

The electronic device 102 may receive an output of the neural network 106 for the fed input. The output may include second texture information and a second set of displacement maps. The electronic device 102 may be configured to generate a second 3D mesh of the human face 114 with a second face expression which may be different from the first face expression. The second 3D mesh may be generated based on the received output. In an embodiment, the second face expression may be a face expression that may indicate one of a plurality of emotional states, such as but not limited to, surprise, fear, disgust, contempt, anger, sadness, and happiness. Details about the generation of the second 3D mesh are provided, for example, in FIGS. 3 and 5.

In the foregoing description, the process to generate a 3D mesh (i.e. the second 3D mesh) with a particular face expression (such as a smiling face) from a seed 3D mesh (i.e. the first 3D mesh with a neutral expression) is described, for example. The process can be used to generate 3D face meshes with any expression. For that, the neural network 106 can be trained on a training dataset, which may include examples for several face expressions. Also, the neural network 106 may be trained to generate a set of 3D meshes with different expressions at once. A certain number of face-meshes with different expressions may be required for good facial animation results. When a set of face meshes (or blend shapes) are available, a new face expression can be generated by blending such meshes using a weighted average of such meshes.

Figure 2:
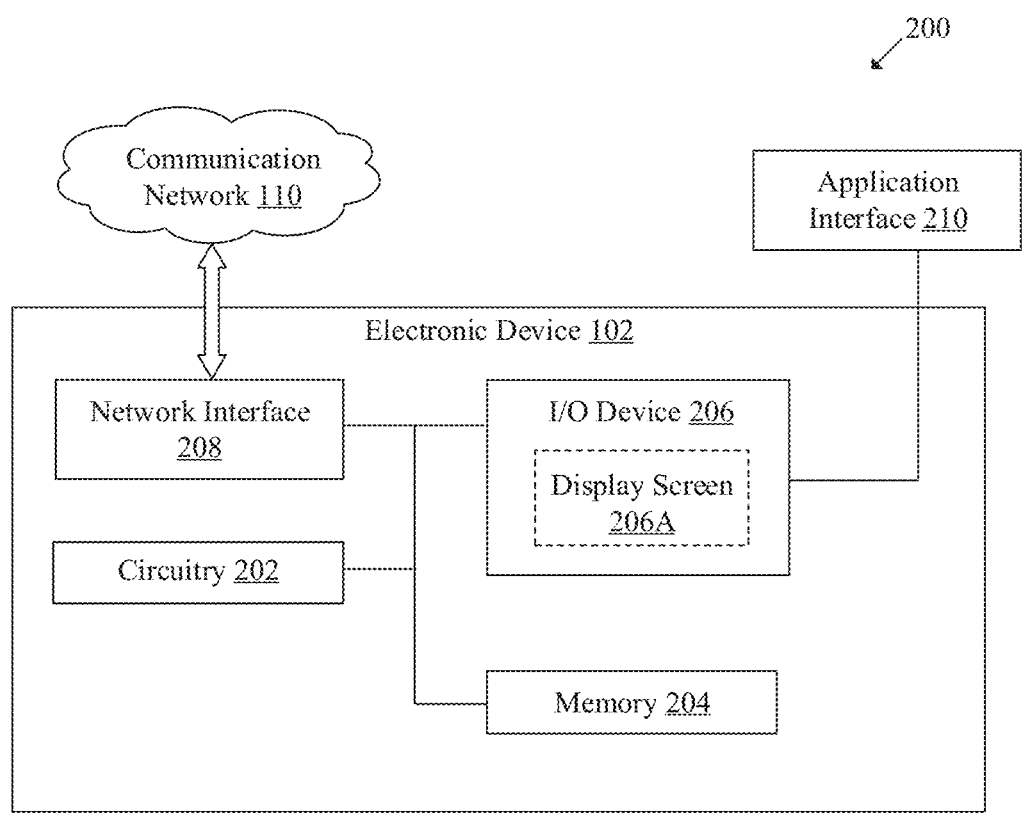
FIG. 2 is an exemplary block diagram of an electronic device for 3D face modeling based on neural networks, in accordance with an embodiment of the disclosure.

FIG. 2 is an exemplary block diagram of the electronic device of FIG. 1, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, and a network interface 208. With reference to FIG. 2, there is further shown a display screen 206A. The circuitry 202 may be communicatively coupled to the memory 204, the I/O device 206, the network interface 208, and an application interface 210.

The circuitry 202 may include suitable logic, circuitry, and interfaces that may be configured to execute program instructions stored in the memory 204. The program instructions may correspond to at least a first set of operations for generating a second 3D mesh of the human face 114 with a second face expression which may be different from the first face expression. The circuitry 202 may be implemented based on a number of processor technologies known in the art. Examples of the circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may include suitable logic, circuitry, and/or interfaces that may be configured to store the program instructions executable by the circuitry 202. Additionally, the memory 204 may store the 2D color image 112 and the first set of displacement maps. In at least one embodiment, the memory 204 may store the neural network 106. In some embodiments, the memory 204 may be further configured to store a mean 3D mesh of the human face 114 with the first face expression (and/or the second face expression). Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O channel/interface between a user and the electronic device 102. The I/O device 206 may be configured to receive a user input via the application interface 210 to generate the second 3D mesh of the human face 114 with the second face expression (and/or the first face expression). The I/O device 206 may include various input and output devices, which may be configured to communicate with different operational components of the electronic device 102. Examples of the I/O device 206 may include, but are not limited to, a touch screen, a keyboard, a mouse, a joystick, a microphone, and a display screen (for example, the display screen 206A).

The display screen 206A may include suitable logic, circuitry, and interfaces that may be configured to display the application interface 210. In some embodiments, the display screen 206A may be an external display device associated with the electronic device 102. The display screen 206A may be a touch screen which may enable a user to provide a user-input via the display screen 206A. The display screen 206A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 206A may refer to a display screen of a head mounted device (HMD), a smart-glass device, a see-through display, a projection-based display, an electro-chromic display, or a transparent display.

The network interface 208 may include suitable logic, circuitry, interfaces, and/or code that may be configured to establish communication between the electronic device 102, the image-capture device 104, and the server 108, via the communication network 110. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 210 may be configured to take input from the user and display output to the user. The application interface 210 may be configured as a medium for the user to interact with the electronic device 102. The application interface 210 may be configured to have a dynamic interface that may change according to the preferences set by the user and configuration of the electronic device 102. In some embodiments, the application interface 210 may correspond to a user interface of one or multiple applications installed on the electronic device 102.

The functions or operations executed by the electronic device 102, as described in FIG. 1, may be performed by the circuitry 202. Operations executed by the circuitry 202 are described in detail, for example, in FIGS. 3A, 3B, 4, 5, and 6.

Figure 3A:
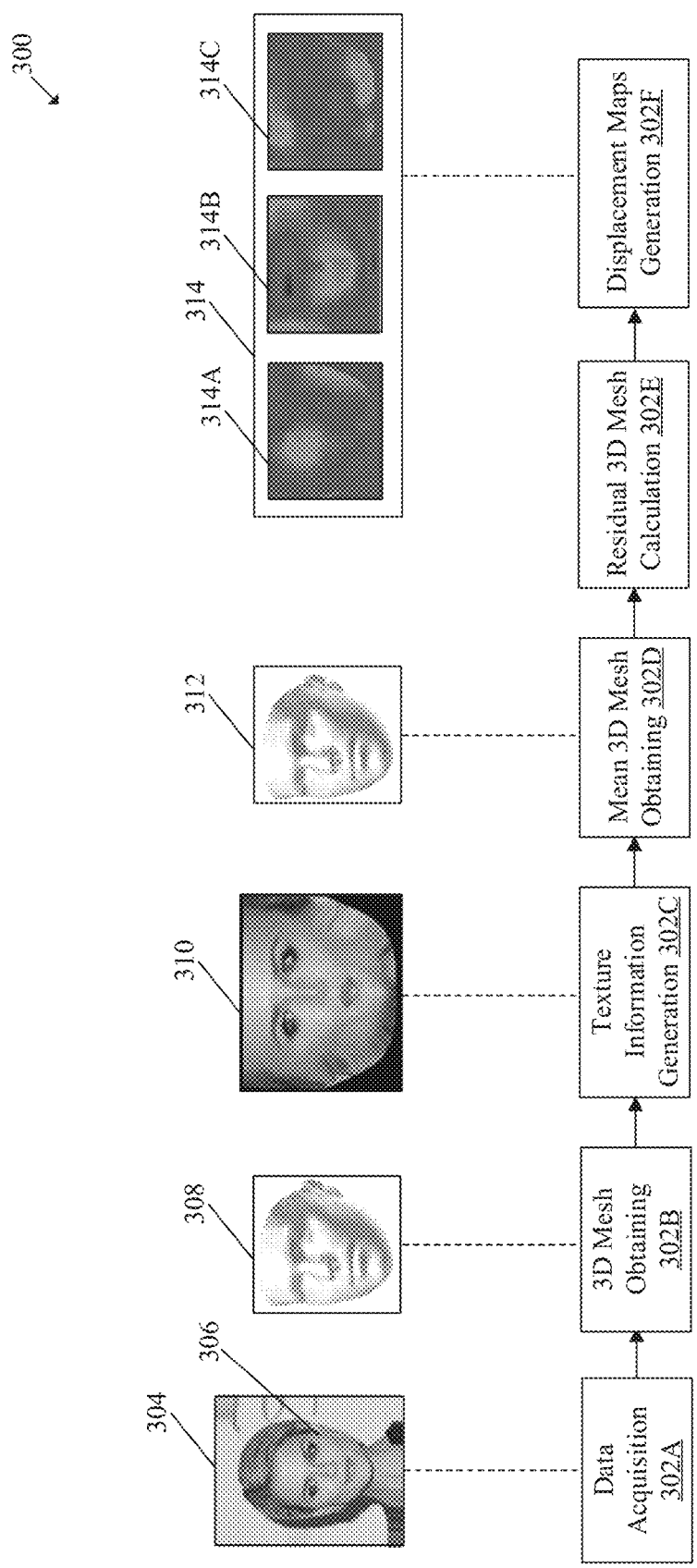
FIGS. 3A and 3B collectively illustrate exemplary operations for 3D face modeling based on neural networks, in accordance with an embodiment of the disclosure.
Figure 3B:
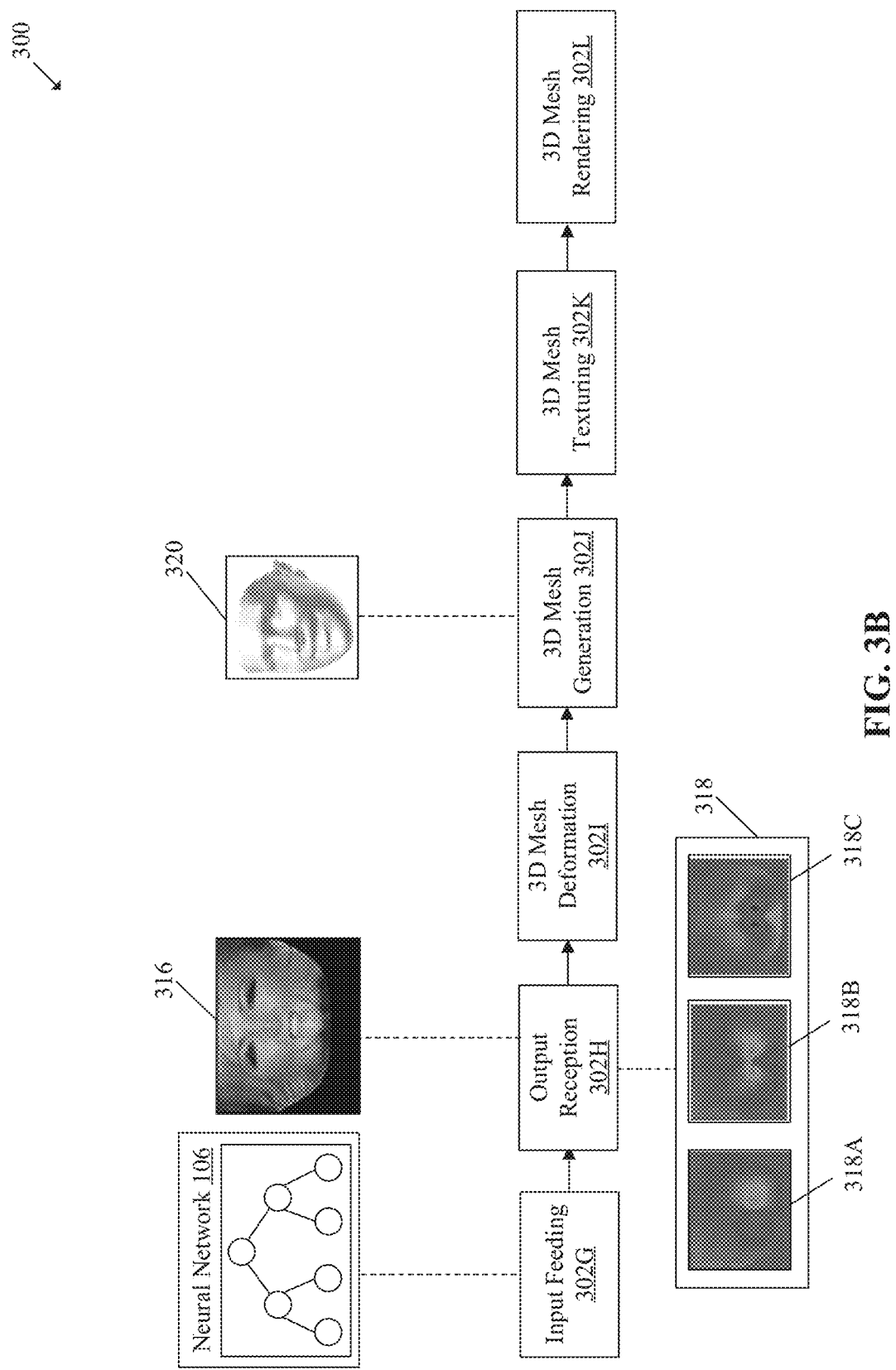

FIGS. 3A and 3B collectively illustrate exemplary operations for 3D face modeling based on neural networks, in accordance with an embodiment of the disclosure. FIGS. 3A and 3B are explained in conjunction with elements from FIG. 1 and FIG. 2. With reference to FIGS. 3A and 3B, there is shown a block diagram 300 that illustrates exemplary operations from 302A to 302L, as described herein. The exemplary operations illustrated in the block diagram 300 may start at 302A and may be performed by any computing system, apparatus, or device, such as by the electronic device 102 of FIG. 1 or FIG. 2. Although illustrated with discrete blocks, the exemplary operations associated with one or more blocks of the block diagram 300 may be divided into additional blocks, combined into fewer blocks, or eliminated, depending on the particular implementation.

At 302A, a data acquisition operation may be performed. In the data acquisition operation, the circuitry 202 may control the image-capture device 104 to capture the 2D color image 304 of the human face 306 face with a first face expression. In some embodiments, the first face expression may be a neutral face expression (also called as neutral face or no expression) in which face muscles may be in a relaxed position and the human face 306 may be visibly devoid of an emotional expression. The image-capture device 104 may be configured to transmit the captured 2D color image 304 of the human face 306 to the electronic device 102. The electronic device 102 may receive the 2D color image 304 from the image-capture device 104. In some embodiments, the 2D color image 304 of the human face 306 with the first face expression may be stored on the server 108. In such cases, the electronic device 102 may retrieve the stored 2D color image 304 directly from the server 108.

At 302B, a first 3D mesh 308 may be obtained. The circuitry 202 may be configured to obtain the first 3D mesh 308 of the human face 306 with the first face expression. The first 3D mesh 308 may be obtained based on the 2D color image 304. Any suitable 3D reconstruction method may be used to obtain the first 3D mesh 308 from a single image. Some 3D reconstruction methods rely on using neural networks for 2D/3D face landmark detection and/or pose detection in an image. Some 3D reconstruction methods use deform a known human face prior based on features of the face in an image. Some methods rely on trained neural networks or machine learning models to directly reconstruct a 3D mesh from one or more 2D images. Details of various 3D reconstruction methods for obtaining the first 3D mesh 308 may be known to one skilled in the art, and therefore, a detailed description of such methods has been omitted from the disclosure for the sake of brevity.

At 302C, texture information for the first 3D mesh may be generated. The circuitry 202 may be configured to generate first texture information 310 for the obtained first 3D mesh 308. The first texture information 310 may be generated based on the received 2D color image 304. In some embodiments, the first texture information 310 may be a texture map which may include the RGB texture for the first 3D mesh 308 on a U-V coordinate map. A texture of the 2D color image 304 may provide information about a spatial arrangement of colors or intensities in the 2D color image 304. The texture may also be defined as a repeating pattern of local variations in the image intensity and therefore, the texture may not be defined for a particular point but only for a group of points. Therefore, the first texture information 310 may include information about the spatial arrangement of colors or intensities in the 2D color image 304.

In some embodiments, the generated first texture information 310 may indicate the spatial arrangement of the colors or intensities in the received 2D color image 304 of the human face 306. The generated first texture information 310 may include a Red-Green-Blue (RGB) intensity values for the human face 306 with the first face expression.

At 302D, a mean 3D mesh 312 may be obtained. In an embodiment, the circuitry 202 may be configured to obtain the mean 3D mesh 312 of the human face 306 with the first face expression. The mean 3D mesh 312 may be an average of a set of reference 3D meshes. Each of such reference 3D meshes may correspond to a face of a same or a different person, with the first face expression. In some embodiments, the electronic device 102 may be configured to generate the mean 3D mesh 312. In some other embodiments, the mean 3D mesh 312 may be pre-loaded from the server 108 and stored in the memory 204.

At 302E, a residual 3D mesh calculation may be performed. The circuitry 202 may be configured to calculate a residual 3D mesh (not shown). The residual 3D mesh may be calculated by subtracting the obtained mean 3D mesh 312 from the obtained first 3D mesh 308. Techniques for the subtraction of one 3D mesh from another 3D mesh may be known to one ordinarily skilled in the art. One of such techniques is a Boolean method which can perform operations, such as union, subtraction, and intersection to meshes (open/closed). Details about the subtraction of the obtained mean 3D mesh 312 from the obtained first 3D mesh 308 has been omitted from the disclosure for the sake of brevity.

At 302F, displacement map generation may be performed. In an embodiment, the circuitry 202 may be configured to generate a first set of displacement maps 314. The first set of displacement maps 314 may be generated based on a UV unwrapping of the calculated residual 3D mesh. The UV unwrapping of the calculated residual 3D mesh may correspond to a process of creation of a set of UV maps, each of which may refer to a particular orthogonal axis, such as an X, Y, or Z axis. Each UV map may be a flat representation of the surface of the obtained first 3D mesh 308 in terms of UV coordinates. U and V in UV unwrapping may refer to a horizontal and a vertical axis of the 2D UV coordinate space, similar to X, Y and Z in the 3D space.

In an embodiment, the first set of displacement maps 314 may include a first displacement map 314A along a first orthogonal axis (say X-axis), a second displacement map 314B along a second orthogonal axis (say Y-axis), and a third displacement map 314C along a third orthogonal axis (say Z-axis). Each of the first set of displacement maps 314 may include geometric information associated with vertices on a surface of the first 3D mesh 308 along a corresponding orthogonal axis. By way of example, and not limitation, the first displacement map 314A may include the geometric information associated with the vertices on the surface of the first 3D mesh 308 along X axis, i.e. the first orthogonal axis. The second displacement map 314B may include the geometric information associated with the vertices on the surface of the first 3D mesh 308 along Y axis, i.e. the second orthogonal axis. Similarly, the third displacement map 314C may include the geometric information associated with the vertices on the surface of the first 3D mesh 308 along Z axis, i.e. the third orthogonal axis.

The geometric information may include a difference (i.e. displacement) between a vertex position on the first 3D mesh 308 along an orthogonal axis and a corresponding vertex position on the mean 3D mesh 312 along the same orthogonal axis. In an embodiment, each of the first set of displacement maps 314 may be referred as bivariate data and may be used in deforming the first 3D mesh 308. Details about the deformation are provided, for example, at operation 302I of FIG. 3B.

At 302G, an input may be fed to the neural network 106. In an embodiment, the circuitry 202 may be configured to feed an input to the neural network 106. The input may include the generated first texture information 310 and the generated first set of displacement maps 314, as 6-channel bivariate data. The neural network 106 may be pre-trained on an image-to-image translation task, in which the neural network 106 may process the input in the form of 6-channel bivariate data (for a seed face expression) and may output 6-channel bivariate data (for a new face expression different from the seed face expression). In an exemplary embodiment, the neural network 106 may be a multi-scale image-to-image GAN or a variant thereof. Details about the training of the neural network 106 are provided, for example, in FIG. 6.

At 302H, an output of the neural network 106 may be received. The circuitry 202 may be configured to receive an output from the neural network 106. The output may be received based on the input (at 302G). The received output may include second texture information 316 and a second set of displacement maps 318 in the form of 6-channel bivariate data.

The second texture information 316 may include the RGB texture for a second 3D mesh which may depict a second face expression different from the first face expression of the first 3D mesh 308. Similarly, the second set of displacement maps 318 may be predicted by the neural network 106 for the purpose of deforming the first 3D mesh 308 to generate the second 3D mesh. Similar to the first set of displacement maps 314, the second set of displacement maps 318 may include a fourth displacement map 318A along the first orthogonal axis (say X-axis), a fifth displacement map 318B along the second orthogonal axis (say Y-axis), and a sixth displacement map 318C along the third orthogonal axis (say Z-axis).

At 302I, 3D mesh deformation may be performed. In the operation, the circuitry 202 may be configured to deform the first 3D mesh 308 of the human face 306. The first 3D mesh 308 of the human face 306 may be deformed based on UV mapping the second set of displacement maps 318 onto the first 3D mesh 308. In general, by UV mapping the second set of displacement maps onto the first 3D mesh 308, vertex position of the first 3D mesh 308 may be updated based on X, Y, Z geometry information in the second set of displacement maps 318.

At 302J, 3D mesh generation may be performed. In the operation, the circuitry 202 may be configured to generate a second 3D mesh 320 of the human face 306 with a second face expression, based on the deformation of the first 3D mesh 308. The second face expression may be different from the first face expression and may indicate one of a plurality of emotional states. An example of the second face expression is a smiling face. Examples of emotional states may include, but are not limited to, happiness, sadness, fear, disgust, anger, surprise, amusement, contempt, contentment, embarrassment, excitement, guilt, relief, satisfaction, shame, and shock.

At 302K, a second 3D mesh texturing operation may be performed. In the second 3D mesh texturing operation, the circuitry 202 may be configured to texture the generated second 3D mesh 320 based on the second texture information 316. In some embodiments, the generated second 3D mesh 320 may be textured based on the UV mapping of the second texture information 316 on the generated second 3D mesh 320.

At 302L, a 3D mesh rendering operation may be performed. In the rendering operation, the circuitry 202 may be configured to render the textured second 3D mesh on the display screen 206A. In some embodiments, the textured second 3D mesh may be rendered as a first blend-shape. A blend-shape may be defined as a 3D face mesh with a face expression. One or more blend shapes may be used to generate new face expressions. Details about the rendering the textured second 3D mesh are provided, for example, in FIG. 5.

FIG. 4 depicts an exemplary architecture for 3D face modeling based on a neural network, in accordance with an embodiment of the disclosure. FIG. 4 is explained in conjunction with elements from FIGS. 1, 2, and 3. With reference to FIG. 4, there is shown an exemplary architecture 400. There is further shown first texture information 402, a first set of displacement maps 404, a neural network 406, second texture information 408, and a second set of displacement maps 410.

The circuitry 202 may receive the 2D color image 304 of the human face 306 with a first face expression. The circuitry 202 may further be configured to obtain the first 3D mesh 308 of the human face 306 with the first face expression based on the received 2D color image 304 (as descried at 302B). The circuitry 202 may generate the first texture information 402 for the obtained first 3D mesh 308 based on the received 2D color image 304. As described earlier, the first texture information 402 may be a 2D texture map that may include RGB intensity values of the human face 306 with the first face expression. The circuitry 202 may further generate the first set of displacement maps 404 based on the obtained first 3D mesh. Details about the generation of the first set of displacement maps 404 are provided, for example, in FIG. 3A.

The first set of displacement maps 404 may include, a first displacement map 404A, a second displacement map 404B, and a third displacement map 404C. The first displacement map 404A may include the geometric information associated with vertices on a surface of the first 3D mesh 308 along a first orthogonal axis (X-axis). The second displacement map 404B may include the geometric information associated with vertices on the surface of the first 3D mesh 308 along a second orthogonal axis (Y-axis). The third displacement map 404C may include the geometric information associated with vertices on the surface of the first 3D mesh 308 along a third orthogonal axis (Z-axis). The geometric information may include a difference (i.e. displacement) between a vertex position on the first 3D mesh 308 along an orthogonal axis and a corresponding vertex position on the mean 3D mesh 312 along the same orthogonal axis. The first texture information 402 along with the first set of displacement maps 404 may be referred to as 6-channel bivariate data.

The 6-channel input data may be fed as input to the neural network 406. The neural network 406 may be an image-to-image GAN that may be trained to accept the 6-channel data as input and produce second 6-channel data, as output, after processing the input. The output of the neural network 406 may include the second texture information 408 and a second set of displacement maps 410. The second texture information 408 may include the RGB intensity values for the human face 306 with a second face expression. The second face expression may be different from the first face expression and may correspond to one of the plurality of emotional states. The second set of displacement maps 410 may include a fourth displacement map 410A, a fifth displacement map 410B, and a sixth displacement map 410C. Details about the second set of displacement maps 410 are provided, for example, in FIG. 3B.

Figure 5:
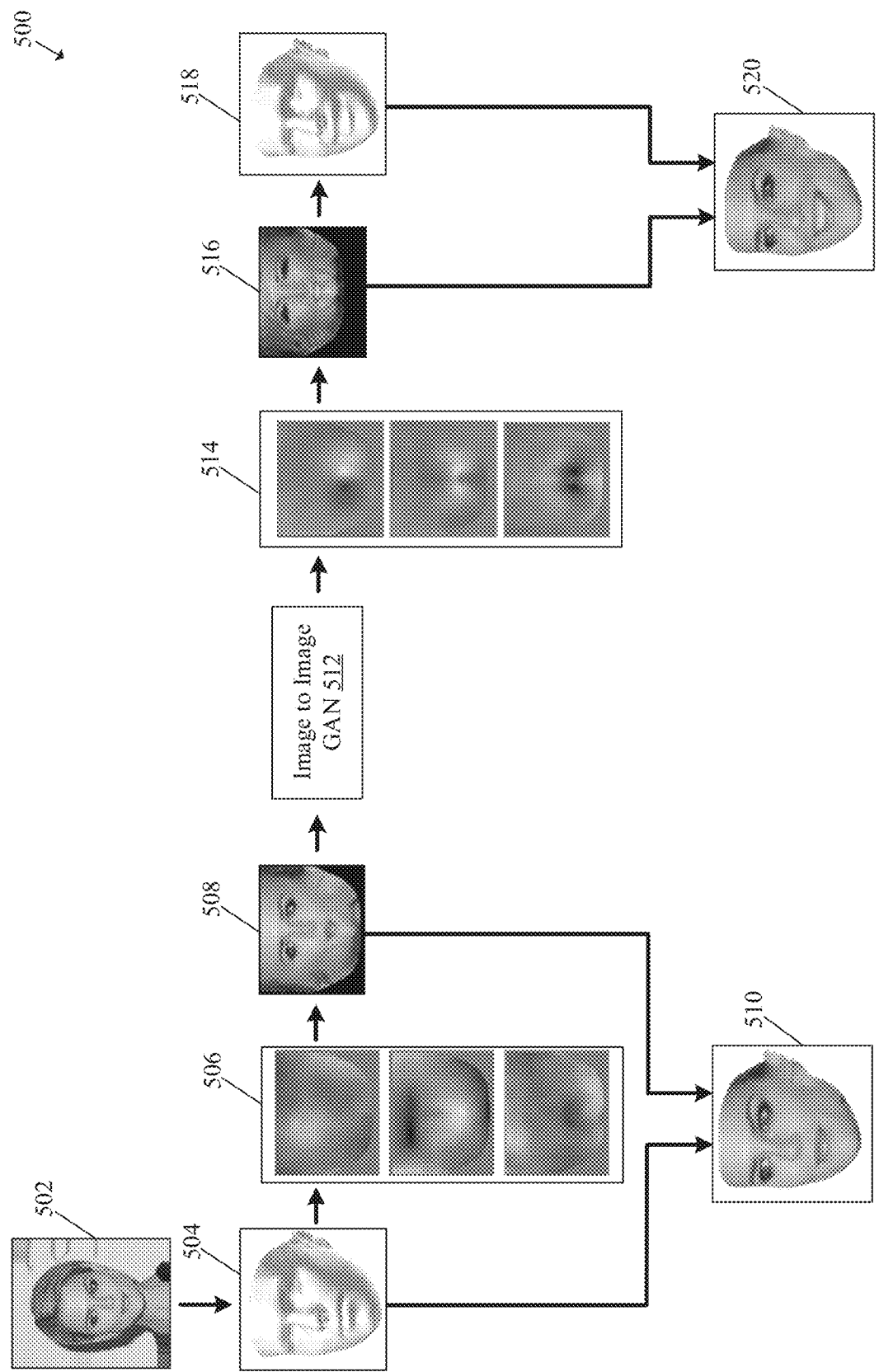
FIG. 5 depicts an exemplary scenario for generation and rendering of blend shapes, in accordance with an embodiment of the disclosure.

FIG. 5 depicts an exemplary scenario for generation and rendering of blend shapes, in accordance with an embodiment of the disclosure. FIG. 5 is explained in conjunction with elements from FIGS. 1, 2, 3A, 3B, and 4. With reference to FIG. 5, there is shown an exemplary scenario 500 that includes a 2D color image 502, a first 3D mesh 504, a first set of displacement maps 506, first texture information 508, and a textured first 3D model 510. There is further shown an image to GAN 512, a second set of displacement maps 514, second texture information 516, a second 3D mesh 518, and a textured second 3D mesh 520.

From the image-capture device 104, the circuitry 202 may receive the 2D color image 502 of a human face with a first face expression. The first face expression may be a neutral face expression (also referred to as no expression or blank expression) in which face muscles may be in a relaxed position and may be visibly devoid of an emotional expression. Also, the circuitry 202 may obtain the first 3D mesh 504 of the human face with the first face expression based on the received 2D color image 502, as described at 302B of FIG. 3A. The circuitry 202 may generate the first set of displacement maps 506 based on the obtained first 3D mesh 504, as described at 302F of FIG. 3A. The circuitry 202 may also generate the first texture information 508 for the obtained first 3D mesh 504 based on the received 2D color image 502, as described at 302C of FIG. 3A. By UV mapping the first texture information 508 on the obtained first 3D mesh 504, the circuitry 202 may apply an RGB texture to the first 3D mesh 504 to generate the textured first 3D model 510.

The circuitry 202 may feed the first set of displacement maps 506 and the first texture information 508, as an input, to the image-to-image GAN 512. The image-to-image GAN 512 may be a multi-scale image-to-image GAN that may be trained to output the second set of displacement maps 514 and the second texture information 516 based on the fed input.

The circuitry 202 may receive the output of the image-to-image GAN 512. The output may include the second set of displacement maps 514 and the second texture information 516. The circuitry 202 may deform the first 3D mesh 504 of the human face based on UV mapping the second set of displacement maps 514 onto the first 3D mesh 504 to generate the second 3D mesh 518, as described at 302J of FIG. 3B. The circuitry 202 may texture the generated second 3D mesh 518 based on the second texture information 516 to generate the textured second 3D mesh 520 as a first blend-shape. In some embodiments, the circuitry 202 may be configured to render a blend-shape-based facial animation of the human face based on an application of a blending operation on the first blend-shape and a second blend-shape consisting of the first 3D mesh 504.

The process described to generate the first blend shape may be used to generate more blend shapes with face expressions different from the first and second face expressions. For example, if the first blend shape is a smiling face, then more blend shapes with other face expressions, such as a sad face, an angry face, or a disgusted face may be generated using the process described in the foregoing description for the first blend shape or the textured second 3D mesh 520. If there are more blend shapes, then the blending operation may use all such shapes to generate the blend-shape-based facial animation. The blend-shape-based facial animation may be a dynamic 3D model of the human face, with each 3D frame therein created by blending blend shapes with different face expressions (such as the first face expression and the second face expression) based on weights (as blending coefficients) assigned to such blend shapes.

Figure 6:
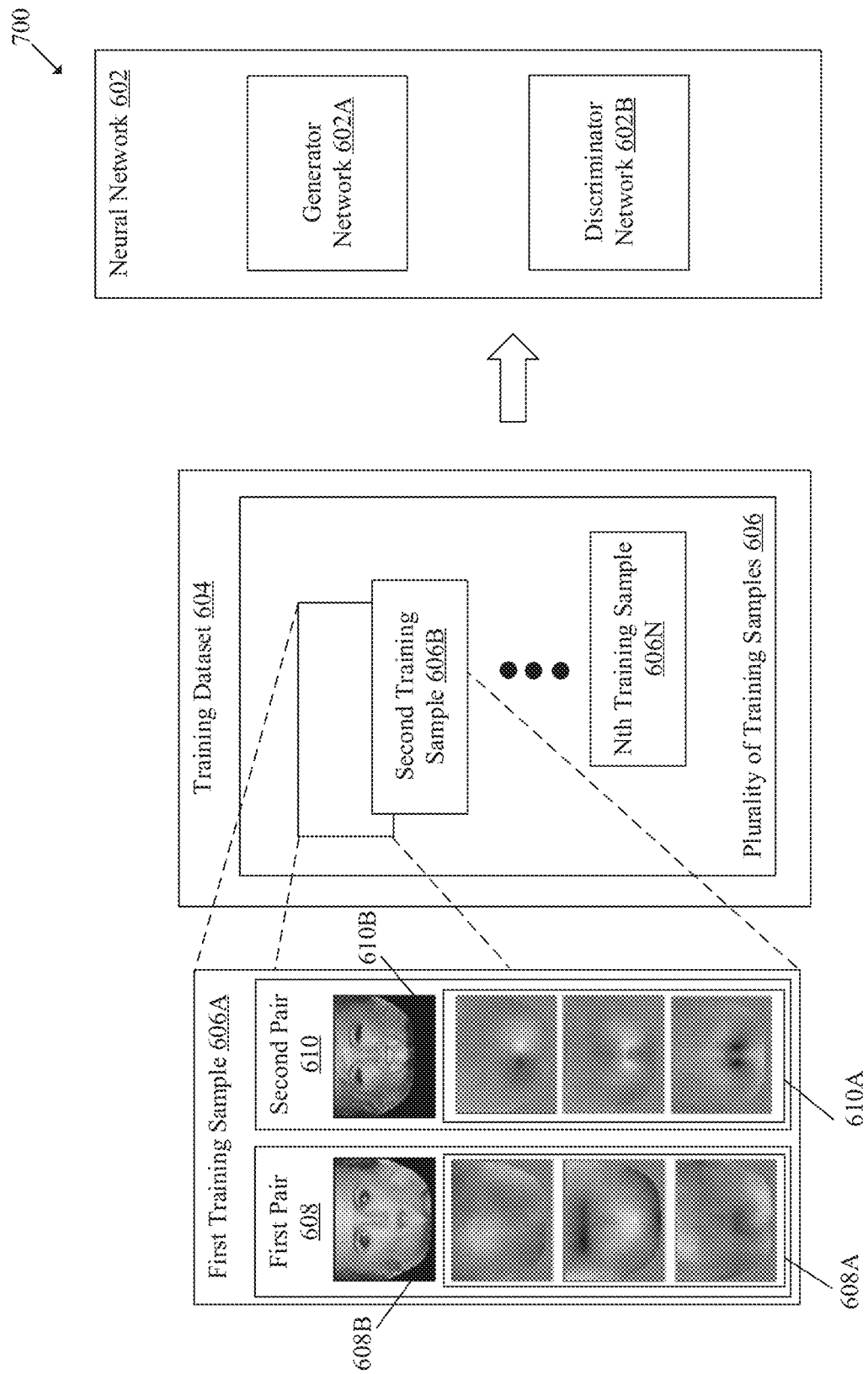
FIG. 6 is a diagram that illustrates training of the neural network, in accordance with an embodiment of the disclosure.

FIG. 6 is a diagram that illustrates training of a neural network, in accordance with an embodiment of the disclosure. FIG. 6 is explained in conjunction with elements from FIGS. 1, 2, 3A, 3B, 4, and 5. With reference to FIG. 6, there is shown a diagram 600. There is further shown a neural network 602 and a training dataset 604. The training dataset 604 may include a plurality of training samples 606. With reference to FIG. 6, there is further shown a first training sample 606A, a second training sample 606B . . . , and an Nth training sample 606N.

The circuitry 202 may generate the training dataset that may include the plurality of training samples 606. Each of the plurality of training samples 606 may include first pair of displacement maps and texture information 608 corresponding to a neutral face expression and a second pair of displacement maps and texture information 610 corresponding to a face expression that may be different from the neutral face expression. By way of example, and not limitation, the generated training dataset 604 may include the first set of displacement maps 608A, the first texture information 608B, the second set of displacement maps 610A, and the second texture information 6108 as the first training sample 606A of the plurality of training samples 606 of the training dataset 604. The first set of displacement maps 608A and the first texture information 608B may be considered as the first pair of displacement maps and texture information 608. Similarly, the second set of displacement maps 610A and the second texture information 610B may be considered as the second pair of displacement maps and texture information 610.

The circuitry 202 may be configured to train the neural network 602 based on the training dataset. Specifically, the circuitry 202 may train the neural network 602 on each training sample of the plurality of training samples 606. For example, for the first pair of displacement maps and texture information 608 as input, the neural network 602 may be trained to predict the second pair of displacement maps and texture information 610. The training of the neural network 602 may be done based on an adversarial training process, as described in FIG. 1. The neural network 602 may include a generator network 602A and a discriminator network 602B. The generator network 602A and the discriminator network 602B may be trained separately independent of each other. At first, the discriminator network 602B may be trained for one or more epochs. After the training of the discriminator network 602B, the generator network 602A may be trained for one or more epochs. Details about the training of the neural network 602 may be known to one skilled in the art, and therefore, a detailed description for the training of the neural network 602 has been omitted from the disclosure for the sake of brevity.

In some embodiments, the neural network 602 may be trained to output at least two sets of texture information and displacement maps, each of which may be associated with a face expression which may be different from one another and different from an expression associated with an input to the neural network. The circuitry 202 may generate at least two 3D meshes of the human face, each with different face expressions.

The scope of the present disclosure may not be just limited to a human face. In some embodiments, the present disclosure may be applicable to any inanimate or animate object which can be animated using blend shapes. In such cases, the neural network 602 may be trained to process 3D meshes of any animate or inanimate object to generate a new 3D mesh of the animate or inanimate object with a variation.

Figure 7:
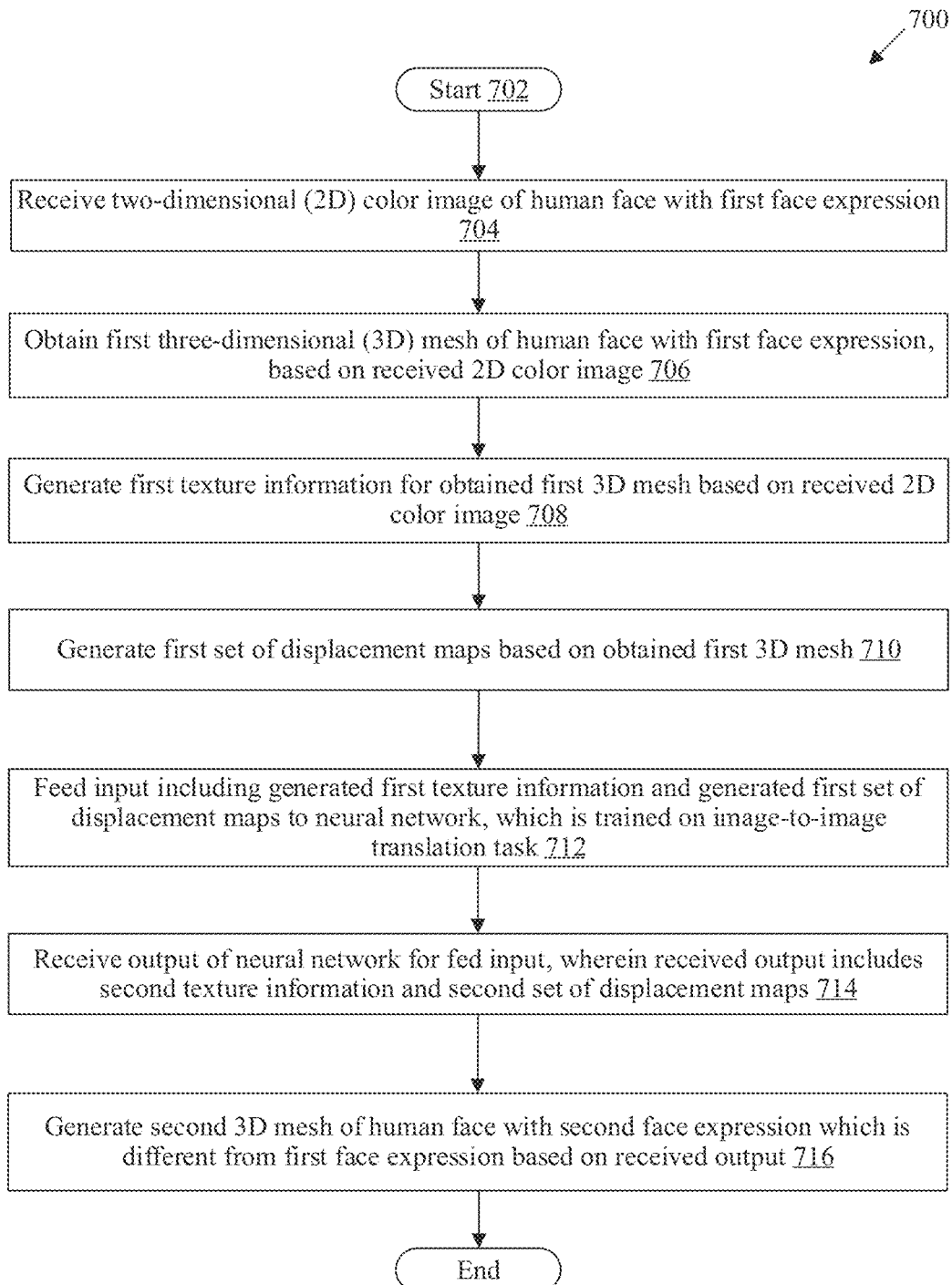
FIG. 7 is a flowchart that illustrates an exemplary method for 3D face modeling based on neural networks, in accordance with an embodiment of the disclosure.

FIG. 7 is a flowchart that illustrates an exemplary method for 3D face modeling based on neural networks, in accordance with an embodiment of the disclosure. FIG. 8 is explained in conjunction with elements from FIGS. 1, 2, 3A, 3B, 4, 5, and 6. With reference to FIG. 7, there is shown a flowchart 700. The operations of the exemplary method may be executed by any computing system, for example, by the electronic device 102 of FIG. 1 or the circuitry 202 of FIG. 2. The operations of the flowchart 800 may start at 702 and may proceed to 704.

At 704, the 2D color image 304 of the human face 306 with a first face expression may be received. In at least one embodiment, the circuitry 202 may receive the 2D color image 304 of the human face 306 with the first face expression.

At 706, the first three-dimensional (3D) mesh 308 of the human face 306 with the first face expression may be obtained. The first 3D mesh 308 may be obtained based on the received 2D color image 304. In at least one embodiment, the circuitry 202 may obtain the first 3D mesh 308 of the human face 306 with the first face expression.

At 708, the first texture information 310 for the obtained first 3D mesh 308 may be generated. The first texture information 310 may be generated based on the received 2D color image 304. In at least one embodiment, the circuitry 202 may generate the first texture information 310 for the obtained first 3D mesh 308 based on the received 2D color image 304.

At 710, the first set of displacement maps 314 may be generated. The first set of displacement maps 314 may be generated based on the obtained first 3D mesh 308. In at least one embodiment, the circuitry 202 may generate the first set of displacement maps 314 based on the obtained first 3D mesh 308.

At 712, an input may be fed to the neural network 106. The input may include the generated first texture information 310 and the generated first set of displacement maps 314. The neural network 106 may be trained on an image-to-image translation task. In at least one embodiment, the circuitry 202 may feed the input including the generated first texture information 310 and the generated first set of displacement maps 314 to the neural network 106 that may be trained on the image-to-image translation task.

At 714, an output of the neural network 106 for the fed input may be received. The received output may include the second texture information 316 and the second set of displacement maps 318. In at least one embodiment, the circuitry 202 may receive the output of the neural network 106 for the fed input, wherein the received output includes the second texture information 316 and the second set of displacement maps 318.

At 716, the second 3D mesh 320 of the human face 306 with the second face expression may be generated. The second 3D mesh 320 may be generated based on the received output. The second face expression may be different from the first face expression. In at least one embodiment, the circuitry 202 may generate second 3D mesh 320 of the human face 306 with the second face expression which may be different from the first face expression. Control may pass to end.

Various embodiments of the disclosure may provide a non-transitory computer-readable medium and/or storage medium having stored thereon, instructions executable by a machine and/or a computer to operate an electronic device (e.g., the electronic device 102) for 3D face modeling based on neural networks. The instructions may cause the machine and/or computer to perform operations that include receiving a two-dimensional (2D) color image (e.g., the 2D color image 304) of a human face (e.g., the human face 306) with a first face expression. The operations further include obtaining a first three-dimensional (3D) mesh (e.g., the first 3D mesh 308) of the human face with the first face expression based on the received 2D color image. The operations further include generating first texture information (e.g., the first texture information 310) for the obtained first 3D mesh based on the received 2D color image. The operations further include generating a first set of displacement maps (e.g., the first set of displacement maps 314) based on the obtained first 3D mesh. The operations further include feeding an input including the generated first texture information and the generated first set of displacement maps to a neural network (e.g., the neural network 106) that is trained on an image-to-image translation task. The operations further include receiving an output of the neural network for the fed input. The received output includes second texture information (e.g., the second texture information 316) and a second set of displacement maps (e.g., the second set of displacement maps 318). The operations further include generating a second 3D mesh (e.g., the second 3D mesh 320) of the human face with a second face expression which is different from the first face expression based on the received output.

Certain embodiments of the disclosure may be found in an electronic device and a method for 3D face modeling using generative adversarial network. Various embodiments of the disclosure may provide the electronic device 102 that may include the circuitry 202 configured to receive a two-dimensional (2D) color image 304 of a human face 306 with a first face expression. The first face expression may be neutral face expression in which face muscles may be in a relaxed position and may be visibly devoid of an emotional expression. The circuitry 202 may obtain a first three-dimensional (3D) mesh 308 of the human face 306 with the first face expression based on the received 2D color image 304. The circuitry 202 may further generate the first texture information 310 for the obtained first 3D mesh 308 based on the received 2D color image 304.

In accordance with an embodiment, the circuitry 202 may be further configured to obtain a mean 3D mesh 312 of the human face 306 with the first face expression. The circuitry 202 may be further configured to calculate a residual 3D mesh based on subtraction of the obtained mean 3D mesh 312 from the obtained first 3D mesh 308. The circuitry 202 may be further configured to generate the first set of displacement maps 314 based on a UV unwrapping of the calculated residual 3D mesh.

In accordance with an embodiment, the first set of displacement maps 314 may include a first displacement map 314A along a first orthogonal axis, a second displacement map 314B along a second orthogonal axis, and a third displacement map 314C along a third orthogonal axis. Each of the first set of displacement maps 314 may further include geometric information associated with vertices on a surface of the first 3D mesh 308 along a corresponding orthogonal axis.

In accordance with an embodiment, the circuitry 202 may be further configured to feed an input to a neural network 106. The neural network 106 may be an image-to-image Generative Adversarial Network (GAN) that may be trained on an image-to-image translation task. The input may include the generated first texture information 310 and the generated first set of displacement maps 314.

In accordance with an embodiment, the circuitry 202 may be configured to receive an output of the neural network 106 for the fed input. The received output may include second texture information 316 and a second set of displacement maps 318. The circuitry 202 may be configured to deform the first 3D mesh 308 of the human face 306 based on UV mapping the second set of displacement maps 318 onto the first 3D mesh 308. The circuitry 202 may be further configured to generate the second 3D mesh 320 based on the deformation.

In accordance with an embodiment, the circuitry 202 may be configured to texture the generated second 3D mesh 320 based on the second texture information 316 and render the textured second 3D mesh 520 as a first blend-shape. The circuitry 202 may further render a blend-shape-based facial animation of the human face 306 based on application of a blending operation on the first blend-shape and a second blend-shape that includes the first 3D mesh 308. The generated second 3D mesh 320 of the human face 306 may be with a second face expression which may be different from the first face expression. The second face expression may be a face expression, which may be different from a neutral face expression and indicates one of a plurality of emotional states.

In accordance with an embodiment, the circuitry 202 may be configured to generate a training dataset 604 that may include a plurality of training samples 606. Each of the plurality of training samples 606 may include a first pair of displacement maps and texture information 608 corresponding to a neutral face expression and a second pair of displacement maps and texture information 610 corresponding to a face expression different from the neutral face expression. The circuitry 202 may be configured to train the neural network 106 on each of the plurality of training samples 606 of the generated training dataset 604. The generated training dataset 604 may include the first set of displacement maps 314, the first texture information 310, the second set of displacement maps 318, and the second texture information 316 as a first training sample of the plurality of training samples of the training dataset.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. An electronic device, comprising:
   circuitry configured to:
   receive a two-dimensional (2D) color image of a human face with a first face expression;
   obtain a first three-dimensional (3D) mesh of the human face with the first face expression, based on the received 2D color image;
   generate first texture information for the obtained first 3D mesh based on the received 2D color image;
   generate a first set of displacement maps based on the obtained first 3D mesh, wherein
      the first set of displacement maps comprises a first displacement map along a first orthogonal axis, a second displacement map along a second orthogonal axis, and a third displacement map along a third orthogonal axis, and
      each of the first set of displacement maps comprises geometric information associated with vertices on a surface of the first 3D mesh along a corresponding orthogonal axis;
   obtain a mean 3D mesh of the human face with the first face expression, wherein
      the geometric information of the first displacement map includes a difference between a vertex position on the first 3D mesh along the first orthogonal axis and a corresponding vertex position on the mean 3D mesh along the first orthogonal axis;
   feed an input comprising the generated first texture information and the generated first set of displacement maps to a neural network, which is trained on an image-to-image translation task;
   receive an output of the neural network for the fed input, wherein the received output comprises second texture information and a second set of displacement maps;

deform the obtained first 3D mesh of the human face based on UV mapping the second set of displacement maps onto the first 3D mesh; and generate, based on the deformed first 3D mesh of the human face, a second 3D mesh of the human face with a second face expression which is different from the first face expression.

2. The electronic device according to claim 1, wherein the first face expression is a neutral face expression, in which face muscles are in a relaxed position and are visibly devoid of an emotional expression.

3. The electronic device according to claim 1, wherein the second face expression is a face expression, which is different from a neutral face expression and indicates one of a plurality of emotional states.

4. The electronic device according to claim 1, wherein the circuitry is further configured to:

calculate a residual 3D mesh based on subtraction of the obtained mean 3D mesh from the obtained first 3D mesh; and generate the first set of displacement maps based on a UV unwrapping of the calculated residual 3D mesh.

5. The electronic device according to claim 1, wherein the neural network is an image-to-image Generative Adversarial Network (GAN).

6. The electronic device according to claim 1, wherein the circuitry is further configured to:

texture the generated second 3D mesh based on the second texture information; and render the textured second 3D mesh as a first blend-shape.

7. The electronic device according to claim 6, wherein the circuitry is further configured to render a blend-shape-based facial animation of the human face based on application of a blending operation on the first blend-shape and a second blend-shape consisting of the first 3D mesh.

8. The electronic device according to claim 1, wherein the circuitry is further configured to:

generate a training dataset comprising a plurality of training samples, each of which comprises a first pair of displacement maps and texture information corresponding to a neutral face expression and a second pair of displacement maps and texture information corresponding to a face expression different from the neutral face expression; and train the neural network on each of the plurality of training samples of the generated training dataset.

9. The electronic device according to claim 8, wherein the generated training dataset comprises the first set of displacement maps, the first texture information, the second set of displacement maps, and the second texture information as a first training sample of the plurality of training samples of the training dataset.

10. A method, comprising:

receiving a two-dimensional (2D) color image of a human face with a first face expression;

obtaining a first three-dimensional (3D) mesh of the human face with the first face expression, based on the received 2D color image;

generating first texture information for the obtained first 3D mesh based on the received 2D color image;

generating a first set of displacement maps based on the obtained first 3D mesh, wherein the first set of displacement maps comprises a first displacement map along a first orthogonal axis, a second displacement map along a second orthogonal axis, and a third displacement map along a third orthogonal axis, and each of the first set of displacement maps comprises geometric information associated with vertices on a surface of the first 3D mesh along a corresponding orthogonal axis;

obtaining a mean 3D mesh of the human face with the first face expression, wherein the geometric information of the first displacement map includes a difference between a vertex position on the first 3D mesh along the first orthogonal axis and a corresponding vertex position on the mean 3D mesh along the first orthogonal axis;

feeding an input comprising the generated first texture information and the generated first set of displacement maps to a neural network, which is trained on an image-to-image translation task;

receiving an output of the neural network for the fed input, wherein the received output comprises second texture information and a second set of displacement maps;

deforming the obtained first 3D mesh of the human face based on UV mapping the second set of displacement maps onto the first 3D mesh; and generating, based on the deformed first 3D mesh of the human face, a second 3D mesh of the human face with a second face expression which is different from the first face expression.

11. The method according to claim 10, further comprising:

calculating a residual 3D mesh based on subtraction of the obtained mean 3D mesh from the obtained first 3D mesh; and generating the first set of displacement maps based on a UV unwrapping of the calculated residual 3D mesh.

12. The method according to claim 10, wherein the neural network is an image-to-image Generative Adversarial Network (GAN).

13. The method according to claim 10, further comprising:

texturing the generated second 3D mesh based on the second texture information; and rendering the textured second 3D mesh as a first blend-shape.

14. The method according to claim 13, further comprising rendering a blend-shape-based facial animation of the human face based on application of a blending operation on the first blend-shape and a second blend-shape consisting of the first 3D mesh.

15. The method according to claim 11, further comprising:

generating a training dataset comprising a plurality of training samples, each of which comprises a first pair of displacement maps and texture information corresponding to a neutral face expression and a second pair of displacement maps and texture information corresponding to a face expression different from the neutral face expression; and training the neural network on each of the plurality of training samples of the generated training dataset.

16. A non-transitory computer-readable storage medium configured to store instructions that, in response to being executed, causes an electronic device to perform operations, the operations comprising:

receiving a two-dimensional (2D) color image of a human face with a first face expression;

obtaining a first three-dimensional (3D) mesh of the human face with the first face expression, based on the received 2D color image;

generating first texture information for the obtained first 3D mesh based on the received 2D color image;

generating a first set of displacement maps based on the obtained first 3D mesh, wherein
- the first set of displacement maps comprises a first displacement map along a first orthogonal axis, a second displacement map along a second orthogonal axis, and a third displacement map along a third orthogonal axis, and
- each of the first set of displacement maps comprises geometric information associated with vertices on a surface of the first 3D mesh along a corresponding orthogonal axis;

obtaining a mean 3D mesh of the human face with the first face expression, wherein
- the geometric information of the first displacement map includes a difference between a vertex position on the first 3D mesh along the first orthogonal axis and a corresponding vertex position on the mean 3D mesh along the first orthogonal axis;

feeding an input comprising the generated first texture information and the generated first set of displacement maps to a neural network, which is trained on an image-to-image translation task;

receiving an output of the neural network for the fed input, wherein the received output comprises second texture information and a second set of displacement maps;

deforming the obtained first 3D mesh of the human face based on UV mapping the second set of displacement maps onto the first 3D mesh; and generating, based on the deformed first 3D mesh of the human face, a second 3D mesh of the human face with a second face expression which is different from the first face expression.

17. The non-transitory computer-readable storage medium according to claim 16, wherein the neural network is an image-to-image Generative Adversarial Network (GAN).

* * * * *